US005775032A

United States Patent [19]

Lacy

[11] Patent Number: 5,775,032

[45] Date of Patent: Jul. 7, 1998

[54] EXTERIOR MOUNTING PLATE ASSEMBLY

[75] Inventor: Michael A. Lacy, Conyers, Ga.

[73] Assignee: Vantage Products Corporation, Conyers, Ga.

[21] Appl. No.: 858,835

[22] Filed: May 19, 1997

[51] Int. Cl.$^{6}$ .................................. E04B 1/38; F16S 5/00

[52] U.S. Cl. ................................ 52/28; 52/220.1; 174/48; 248/205.1; 362/147; 362/382

[58] Field of Search .................................... 52/27, 28, 58, 52/60, 100, 198, 199, 220.1, 105; 174/48; 248/205.1, 224.51, 544; 362/147, 366, 382

[56] References Cited

U.S. PATENT DOCUMENTS

| | | |
|---|---|---|
| 4,229,916 | 10/1980 | White . |
| 4,635,168 | 1/1987 | Crowley . |
| 4,726,152 | 2/1988 | Vagedef et al. . |
| 4,854,093 | 8/1989 | Kellom . |
| 4,920,708 | 5/1990 | MacLeod et al. . |
| 5,000,409 | 3/1991 | MacLeod et al. . |
| 5,275,366 | 1/1994 | Simmons . |

*Primary Examiner*—Robert Canfield
*Attorney, Agent, or Firm*—Seidel, Gonda, Lavorgna & Monaco, PC

[57] ABSTRACT

A reversible wall mounting plate adapted for mounting to a surface of stepped siding comprising two pieces, a frame and a face portion. The frame, which is symmetrical about an axis, has a continuous wall with opposite first and second free-edge surfaces. Both free-edge surfaces are configured in a stepped fashion and have at least two portions of convex curvature. The convex portions of the first free-edge surface have different dimensions from the convex portions of the second free-edge surface in order to accommodate differently sized siding. The face portion includes a front wall with a peripheral wall extending therefrom; the face portion and frame have cooperating mating elements permitting the face portion to be releasably attached to the frame.

9 Claims, 3 Drawing Sheets

EXTERIOR MOUNTING PLATE ASSEMBLY

FIELD OF THE INVENTION

This invention relates generally to mounting assemblies for attaching fixtures to exterior walls, and specifically to an exterior mounting plate for use on walls having manufactured siding. The mounting plate assembly described herein can be adapted to hold various fixtures, and even cover holes or imperfections in the siding.

BACKGROUND OF THE INVENTION

It is often desired, or even necessary, to install various fixtures such as lights or decorative features on an exterior wall of a building. Mounting fixtures is sometimes difficult when the exterior wall is finished with siding. Exterior siding, usually of vinyl or aluminum, is most commonly affixed to a building's exterior wall in panels forming a "stepped" or overlapping ("lapped") configuration. The lapped siding configuration makes it challenging to easily and neatly install fixtures which have flat, rigid surfaces. Moreover, the siding itself is often not strong enough to support an installed fixture.

One solution to the problem of mounting fixtures to sided exterior walls requires cutting away a section of siding to expose the sheathing below, and attaching a fixture to the sheathing. This solution requires the destruction of part of the siding, which is an expensive undertaking if the installed fixture is not meant to be permanent. Nor is this solution desirable to the "do-it-yourselfer."

Other solutions require the use of a mounting plate. A typical mounting plate consists of a one-piece rigid body and has a front face noncoplanar with the wall, designed to provide a flat surface for fixture mounting, and a rear face designed to be positioned directly against the sided wall. Though some mounting plates still require the removal of siding, most are designed to attach directly to the lapped siding in one way or another. Mounting plates currently available, however, are limited in their versatility, durability, and structural integrity.

Despite the prevalence of construction industry standards, manufactured siding is commercially available in different sized widths. One-piece rigid body mounting plates are not adaptable to differently sized panels. Further, the stepped profile of a sided wall does not actually consist of stepped, flat, parallel surfaces. Rather, the individual stepped surfaces exhibit a definite concavity. One-piece mounting plates currently available may possess rear surfaces formed in a stepped fashion, but these stepped mounting plate surfaces are flat. Attaching this type of mounting plate to siding cannot result in a flush mount because the flat surface of the mounting plate does not follow the concave contour of the siding. The resulting gaps between mounting plate and siding leave unsightly imperfections and permit water infiltration, or alternatively require the use of caulking material around the plate, increasing labor costs. An imperfect fit between mounting plate and exterior wall also promotes a structurally inferior attachment, as the surface area of the mounting plate in contact with siding is minimized.

Thus, there is a definite need for a cost-effective exterior wall mounting plate which is easy to install, which provides an aesthetically pleasing appearance, makes a snug fit with the siding, and can simultaneously accommodate the true shape and size variety of sided wall panels.

SUMMARY OF THE INVENTION

The present invention is directed to a device that satisfies the need for a wall mounting plate that accommodates a variety of wall siding sizes, conforms with the siding's shape, is cost-effective, and is easy to install.

This invention comprises a reversible mounting plate assembly adapted for mounting to the surface of "stepped" siding panel, such as vinyl or aluminum siding. The assembly includes two distinct pieces, a frame and a face. The frame has two opposite sides, or free-edge surfaces, each formed in a stepped fashion and joined by a continuous peripheral wall. The frame is symmetrical about an axis. Each stepped portion of both frame surfaces is shaped in a convex fashion. The result is that the frame is capable of lying flush with stepped siding having a concave surface contour.

In addition, the stepped, convex free-edge surfaces of the frame allow the frame to be reversible, thus permitting its secure attachment to exterior siding of differing sizes. The frame is reversible because all convex portions of both free-edge surfaces are defined by the same radius, but the convex portions of the first free-edge surface have arc lengths different from that of the second free-edge surface. The different arc lengths are chosen to accommodate differently sized siding. Alternatively, reversibility can be achieved if the convex portions of the first free-edge surface are defined by a radius different from that chosen to define the convex portions of the second free-edge surface, the difference also being chosen to accommodate differently sized siding. The face has a front wall and an integral peripheral wall extending outwardly from the front wall. The face connects to the frame by way of cooperating mating elements present on the face part and frame. When mated, the cooperating mating elements permit the face part to be releasably attachable to the frame. In a preferred embodiment of the invention, projections are located on the exterior of the peripheral wall of the frame and recesses are located at corresponding positions on the interior of the peripheral wall of the face part. The recesses receive the projections, enabling the face part and frame to essentially snap together.

No siding need be removed to accommodate the mounting plate assembly. Rather, the exterior mounting plate assembly is secured to a sided wall and a fixture is permanently affixed to the wall through the mounting plate assembly.

It is an object of this invention to provide an improved exterior mounting plate that permits secure attachment to exterior siding which has a concave contour. This objective is accomplished by the convex shape of free-edge surfaces of the frame, which complement the concavity of the exterior siding.

It is further an object of this invention to provide an improved mounting plate that is reversible and universal in its application, in that it can be attached to siding panels of different sizes. In a preferred embodiment of the invention, the two opposite free-edge surfaces of the frame are configured such that one side can accommodate and be flush with a larger siding panel than can the other surface of the frame. Thus, the two-piece nature of the assembly permits either surface of the frame to be employed as necessary. The reversibility of the instant invention provides a cost-effective alternative for sizing and procuring exterior wall mounting plates.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
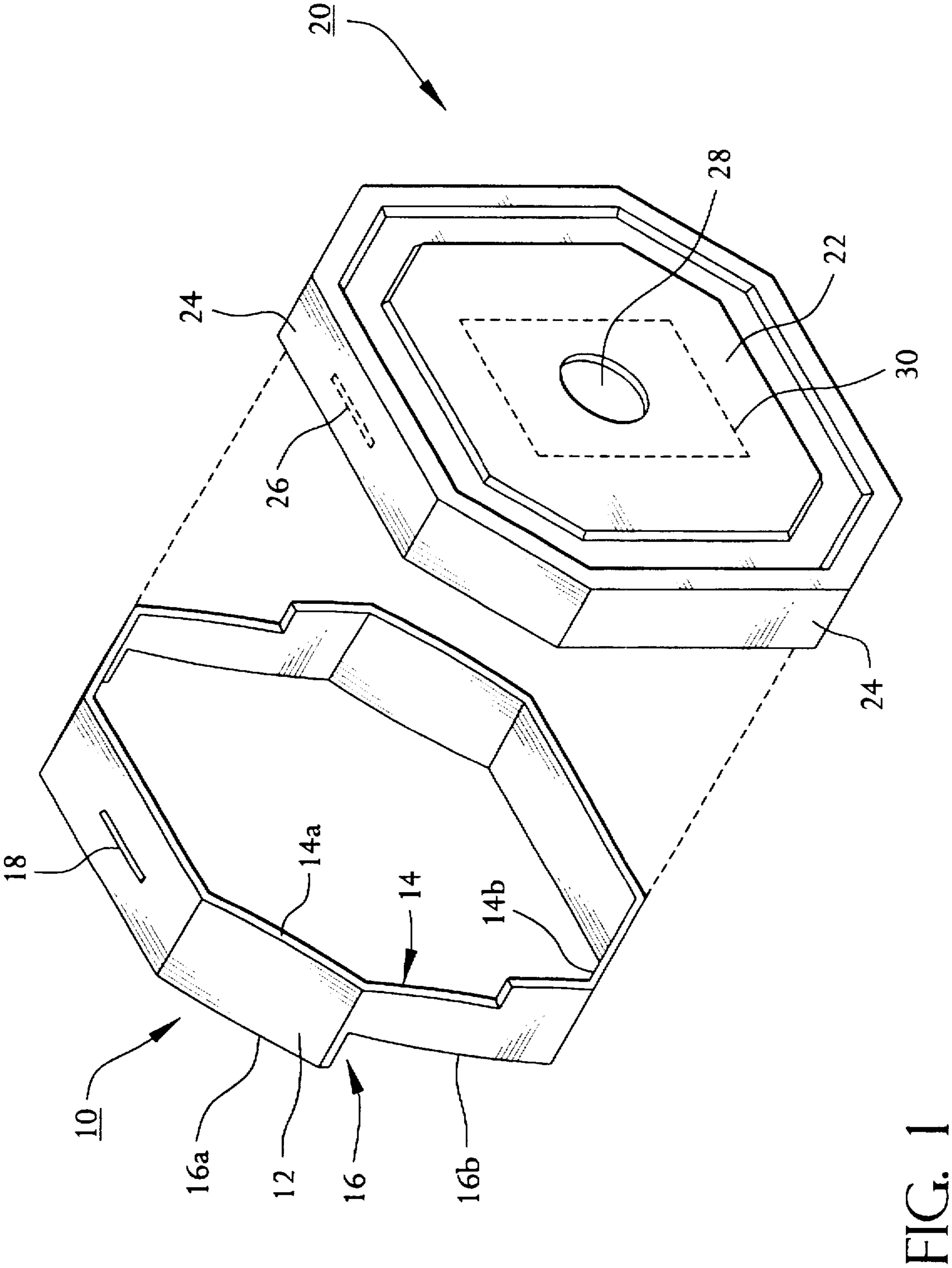
FIG. 1 is an isometric view of a reversible mounting plate assembly according to the invention.

For the purpose of illustrating the invention, there is shown in the drawings a form which is presently preferred; it being understood, however, that this invention is not limited to the precise arrangements and instrumentalities shown.

Referring to the drawings, wherein like numerals refer to like elements, the present invention generally comprises a two-piece reversible wall mounting plate assembly comprising a frame 10 and a face 20. Frame 10 has a continuous wall 12. A wall 12 is bounded by a first free-edge surface 14 and a second free-edge surface 16. The frame 10 is symmetrical about an axis.

Figure 3:
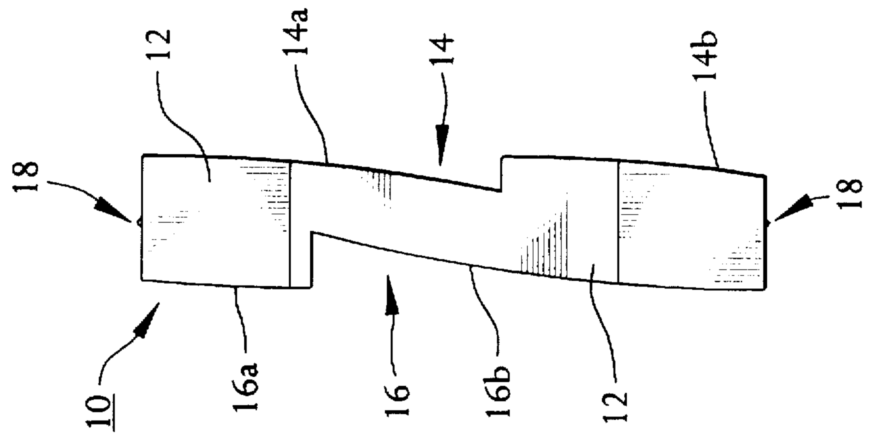
FIG. 3 is a side view of the frame of the mounting plate assembly of FIG. 1.
Figure 2:
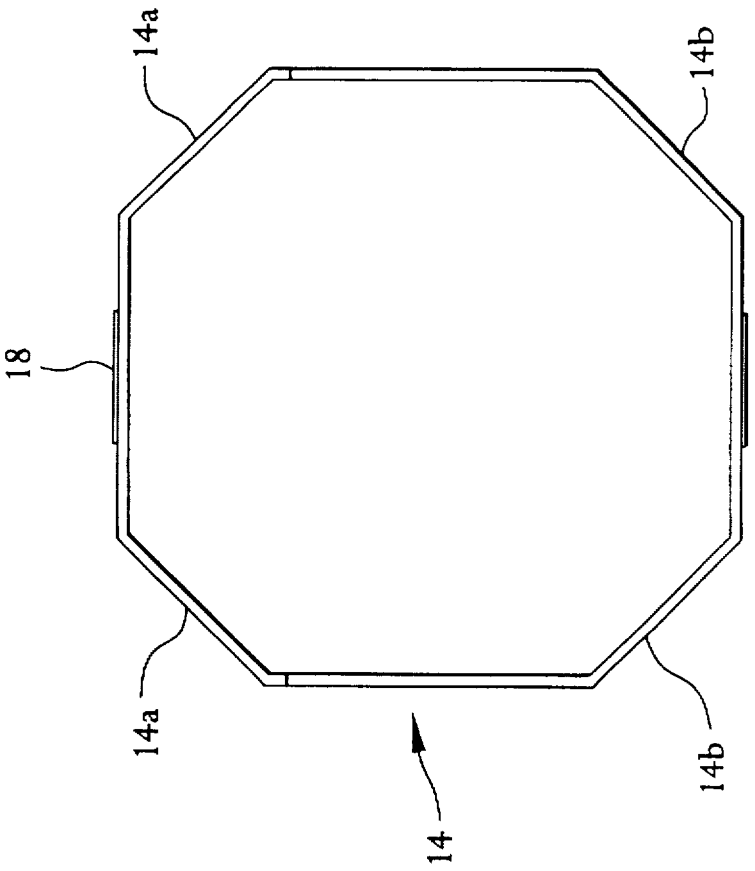
FIG. 2 is a front view of the frame of the mounting plate assembly of FIG. 1.
Figure 4:
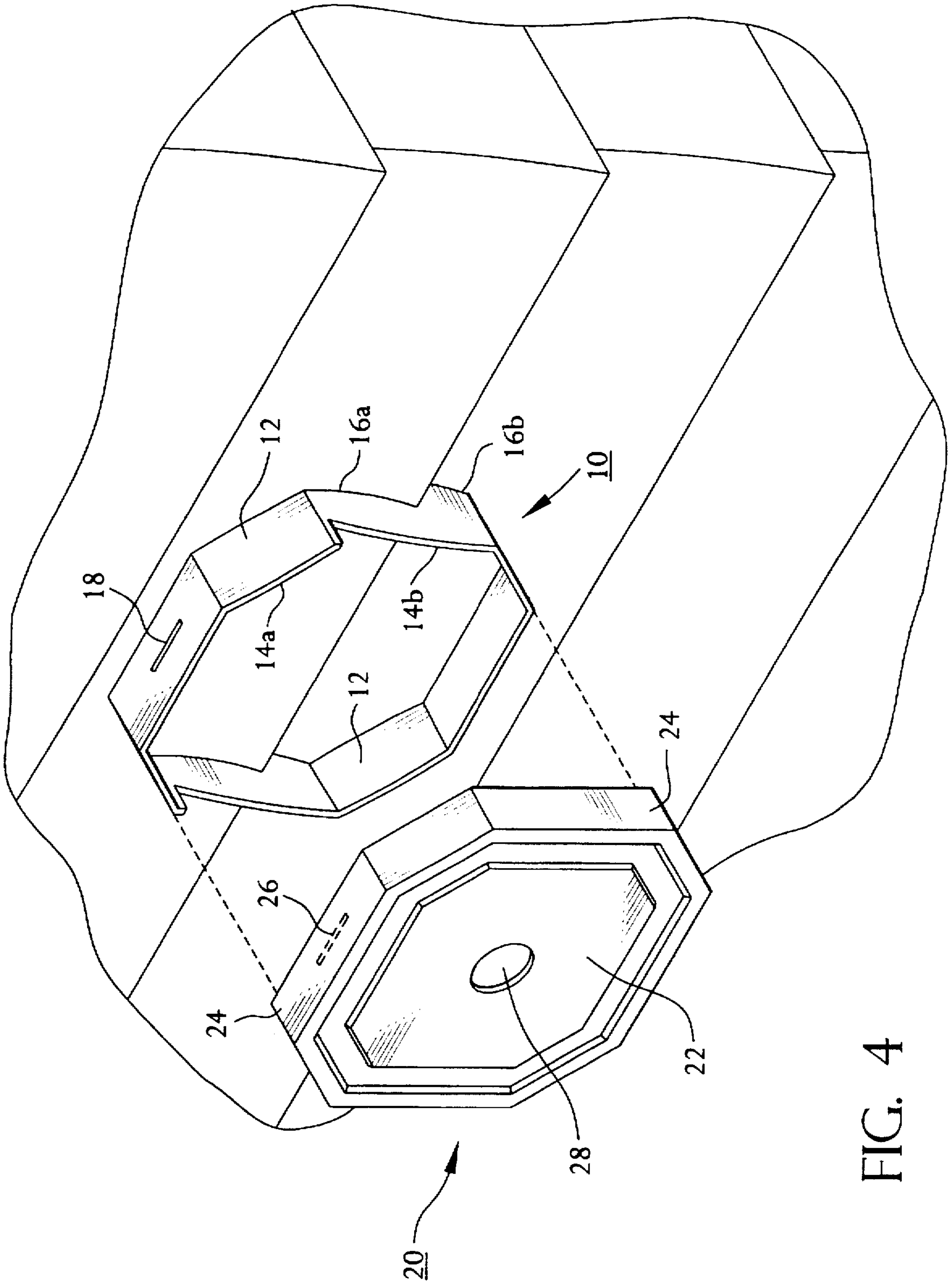
FIG. 4 is an isometric view of a reversible mounting plate assembly according to the present invention, showing it affixed to a sided wall.

The first free-edge surface 14 is configured in a stepped fashion, and has at least two portions of convex curvature 14*a*, 14*b*, best seen in FIG. 3. The second free-edge surface 16 is also configured in a stepped fashion, and also has at least two portions of convex curvature 16*a*, 16*b*. The free-edge surfaces 14, 16 of the frame 10 are configured in a convex fashion in order to accommodate the inherent concavity of stepped siding. Convex-shaped free-edge surfaces of the frame permit a snug fit between mounting plate and sided wall.

In the embodiment of the invention shown, both first 14 and second 16 free-edge surfaces have only two convex portions, although they may have more than two convex portions without departing from the scope of the invention. In this illustrated embodiment, the radius of curvature defining the convex portions 14*a,b* of the first free-edge surface is substantially the same as the radius of curvature defining the convex portions 16*a,b* of the second free-edge surface. In order for the reversible frame 10 to accommodate differently sized stepped siding, the convex portions 14*a,b* of the first free-edge surface have arc lengths different from those of the convex portions 16*a,b* of the second free-edge surface. The resulting frame 10 has two differently convex shaped free-edge surfaces capable of a complementary fit with concave siding of different size. Thus, either side of the reversible frame can be used depending on the size of the stepped siding in which the mounting plate assembly must be attached.

Alternatively, the convex portions 16*a,b* of the second free-edge surface can be defined by a radius of curvature different from the radius defining the curvature of the convex portions 14*a,b* of the first free-edge surface. In such case, the different radii are chosen to accommodate differently sized stepped siding.

Face portion 20 includes a front wall 22 with a peripheral wall 24 extending outwardly from front wall 22.

The frame 10 and face portion 20 both have cooperating mating elements permitting the face portion 20 to be releasably attached to the frame 10. In one embodiment of the invention shown, the frame has a projection 18 located on the wall 12. A plurality of projections 18 may be located at locations on wall 12 of frame 10. For each projection 18 on the frame 10, the face portion 20 has a corresponding recess 26 located on the peripheral wall 24. The recess 26 accommodates the projection 18 when the face portion 20 is placed over the frame 10, permitting face 20 to be releasably attached to frame 10. The releasable feature permits the frame 10 to be easily separated from the face 20, which allows the frame 10 to be reversed for re-installation on siding of a different size. This feature makes the reversible mounting plate assembly of the present invention more versatile and economical than any mounting plate currently available.

In another preferred embodiment of the invention, the face portion 20 contains an aperture 28 through the front wall 22. The aperture 28 permits the introduction of a fixture to the mounting plate assembly.

In still another embodiment of the invention, the face portion 20 contains indicia defining patterned cut-out guides 30. These cut-out guides 30 can be located on the inside of the front wall 22, and permit the mounting plate assembly to be adapted to fixtures of differing size or design by enabling openings of desired shape and size to be made in face 20.

The instant invention can be manufactured of any material deemed appropriate for the intended use of the mounting plate. A preferred material is molded plastic, and in particular, polypropylene.

The present invention may be embodied in other specific forms without departing from the spirit or essential attributes thereof and, accordingly, reference should be made to the appended claims, rather than to the foregoing specification, as indicating the scope of the invention.

What is claimed is:

1. A reversible wall mounting plate assembly adapted for mounting to a surface of stepped siding, comprising:
   - a frame having a continuous wall with opposite first and second free-edge surfaces, and being symmetrical about an axis;
   - said first and second free-edge surfaces configured in a stepped fashion, said first and second free-edge surfaces having at least two portions of convex curvature, said portions of the first free-edge surface having dimensions different from those portions of said second free-edge surface, said dimensions chosen to accommodate differently sized stepped siding; and
   - a face portion including a front wall with a peripheral side wall extending therefrom and substantially surrounding said frame;
   - said face portion and frame having cooperating mating elements permitting the face portion to be releasably attached to the frame.

2. A reversible wall mounting plate assembly as set forth in claim 1, wherein said dimensions comprise arc lengths of a curvature defined by substantially equal radii.

3. A reversible wall mounting plate assembly as set forth in claim 1, wherein said dimensions comprise radii of curvature.

4. A reversible wall mounting plate assembly as set forth in claim 1, wherein said frame and face portion are made of plastic.

5. A reversible wall mounting plate assembly as set forth in claim 1, wherein said face portion contains an aperture through said front wall.

6. A reversible wall mounting plate assembly as set forth in claim 1, wherein said face portion contains indicia defining patterned cut-out guides on the front wall of the face portion.

7. A reversible wall mounting plate assembly as set forth in claim 1, wherein said mating elements comprise projections and recesses.

8. A reversible wall mounting plate assembly adapted for mounting to a surface of stepped siding, comprising:

a frame having a continuous wall with opposite first and second free-edge surfaces, and being symmetrical about an axis;

said first and second free-edge surfaces configured in a stepped fashion, said first free edge surface having at least two portions of convex curvature, the radius of curvature of said convex portions being substantially the same, and said second free-edge surface having at least two portions of convex curvature, the radius of curvature of said convex portions being substantially the same as the radius defining the convex portions of said free-edge surface;

said convex portions of the first free-edge surface having an arc length different from an arc length of the convex portions of the second free-edge surface, said arc lengths being chosen to accommodate differently sized stepped siding; and a face portion including a front wall with a peripheral wall extending therefrom and substantially surrounding said frame;

said face portion and frame having cooperating mating elements permitting the face portion to be releasably attached to the frame.

9. A reversible wall mounting plate assembly adapted for mounting to a surface of stepped siding, comprising:

a frame having a continuous wall with opposite first and second free-edge surfaces, and being symmetrical about an axis;

said first and second free-edge surfaces configured in a stepped fashion, said first and second free-edge surfaces each having at least two portions of convex curvature;

said portions of convex curvature of the second free-edge surface defined by a radius of curvature different from the radius defining the curvature of the convex portions of the first free-edge surface, said radius being chosen to accommodate differently sized stepped siding;

a face portion including a front wall with a peripheral wall extending therefrom and substantially surrounding said frame;

said face portion and frame having cooperating mating elements permitting the face portion to be releasably attached to the frame.

* * * * *